(12) United States Patent
McClurg et al.

(10) Patent No.: US 7,190,535 B2
(45) Date of Patent: Mar. 13, 2007

(54) NON-PLANAR PRISM

(75) Inventors: George W. McClurg, Jensen Beach, FL (US); John F. Carver, Palm City, FL (US); Frank L. Ebright, Hobe Sound, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 11/378,238

(22) Filed: Mar. 20, 2006

(65) Prior Publication Data

US 2006/0158751 A1 Jul. 20, 2006

Related U.S. Application Data

(63) Continuation of application No. 10/725,539, filed on Dec. 3, 2003.

(60) Provisional application No. 60/431,240, filed on Dec. 6, 2002, provisional application No. 60/491,537, filed on Aug. 1, 2003.

(51) Int. Cl.
*G02B 5/04* (2006.01)
*G06K 9/00* (2006.01)

(52) U.S. Cl. ...................................... 359/831; 382/127

(58) Field of Classification Search ................ 359/831, 359/832, 833, 834, 837; 382/127; 385/146
See application file for complete search history.

(56) References Cited

U.S. PATENT DOCUMENTS 1,501,979 A    7/1924 Wilson (Continued)

FOREIGN PATENT DOCUMENTS

| JP | 3-161884 | 7/1991 |
|---|---|---|
| WO | WO 96-17480 A2 | 6/1996 |
| WO | WO 96-17480 A3 | 6/1996 |

OTHER PUBLICATIONS

International Search Report from PCT Appl. No. PCT/US03/38644, filed Dec. 5, 2003, 3 pages.

(Continued)

*Primary Examiner*—Mark A. Robinson
(74) *Attorney, Agent, or Firm*—Sterne, Kessler, Goldstein & Fox P.L.L.C

(57) ABSTRACT

A system and method are provided for scanning all or part of a hand print for one or more hands positioned on a non-planar portion of a prism. The non-planar portion can be symmetrical about an axis of symmetry of the prism. Typically, a palm pocket, writer's palm, or the like, is hard to capture on a flat surface. In contrast, the non-planar portion of the prism according to embodiments of the present invention provides a form so that the palm pocket, writer's palm, or the like, can be captured. Hand and/or finger characteristic data can also be captured, for example hand geometry (e.g., finger lengths and spacing between fingers). The prism can also include a positioning device (e.g., a hand-locating feature) than can be used to position a hand based on a point between a thumb and an index finger, between any other two fingers, a full hand on one side of the alignment device, both hands with each hand on either side of the alignment device, or to capture writer's palm and/or writer's palm and fingertip images.

14 Claims, 18 Drawing Sheets

U.S. PATENT DOCUMENTS

| | | | |
|---|---|---|---|
| 2,146,662 A | 2/1939 | Van | |
| 2,184,858 A | 12/1939 | Goodman | |
| 3,054,854 A | 9/1962 | Neasham | |
| 3,282,152 A | 11/1966 | Myer | |
| 3,333,502 A | 8/1967 | Flanagan | |
| 3,511,571 A | 5/1970 | Ogle | |
| 3,581,282 A | 5/1971 | Altman | |
| 3,648,240 A | 3/1972 | Jacoby et al. | |
| 3,716,301 A | 2/1973 | Caulfield et al. | |
| 3,765,018 A | 10/1973 | Heard et al. | |
| 3,804,524 A | 4/1974 | Jocoy et al. | |
| 3,806,706 A | 4/1974 | Hasslinger et al. | |
| 3,882,462 A | 5/1975 | McMahon | |
| 4,032,889 A | 6/1977 | Nassimbene | |
| 4,106,078 A * | 8/1978 | Inoue | 362/554 |
| 4,128,837 A | 12/1978 | Page | |
| 4,180,306 A | 12/1979 | Duhrkoop et al. | |
| 4,206,441 A | 6/1980 | Kondo | |
| 4,206,556 A | 6/1980 | Sabo et al. | |
| 4,215,274 A * | 7/1980 | Segall | 250/361 R |
| 4,357,597 A | 11/1982 | Butler | |
| 4,387,365 A | 6/1983 | Berry et al. | |
| 4,414,684 A | 11/1983 | Blonder | |
| 4,420,261 A | 12/1983 | Barlow et al. | |
| 4,461,576 A | 7/1984 | King | |
| 4,467,545 A | 8/1984 | Shaw, Jr. | |
| 4,578,793 A | 3/1986 | Kane et al. | |
| 4,611,881 A | 9/1986 | Schmidt et al. | |
| 4,637,718 A | 1/1987 | Kirchner et al. | |
| 4,684,802 A | 8/1987 | Hekenewerth et al. | |
| 4,688,092 A | 8/1987 | Kamel et al. | |
| 4,701,960 A | 10/1987 | Scott | |
| 4,720,869 A | 1/1988 | Wadia | |
| 4,736,203 A | 4/1988 | Sidlauskas | |
| 4,736,436 A | 4/1988 | Yasukawa et al. | |
| 4,751,660 A | 6/1988 | Hedley | |
| 4,751,759 A | 6/1988 | Zoell | |
| 4,774,516 A | 9/1988 | Henri et al. | |
| 4,783,167 A | 11/1988 | Schiller et al. | |
| 4,790,025 A | 12/1988 | Inoue et al. | |
| 4,792,226 A | 12/1988 | Fishbine et al. | |
| 4,794,260 A | 12/1988 | Asano et al. | |
| 4,805,117 A | 2/1989 | Fiore et al. | |
| 4,821,118 A | 4/1989 | Lafreniere | |
| 4,925,300 A * | 5/1990 | Rachlin | 356/71 |
| 5,140,469 A | 8/1992 | Lamarre et al. | |
| 5,146,102 A | 9/1992 | Higuchi et al. | |
| 5,225,924 A | 7/1993 | Ogawa et al. | |
| 5,243,459 A * | 9/1993 | Winston et al. | 359/362 |
| 5,249,370 A | 10/1993 | Stanger et al. | |
| 5,307,264 A | 4/1994 | Waggener et al. | |
| 5,309,274 A | 5/1994 | Akanabe | |
| 5,313,306 A | 5/1994 | Kuban et al. | |
| 5,367,399 A | 11/1994 | Kramer | |
| 5,377,002 A | 12/1994 | Malin et al. | |
| 5,440,428 A | 8/1995 | Hegg et al. | |
| 5,452,135 A | 9/1995 | Maki et al. | |
| 5,469,289 A | 11/1995 | Iwao et al. | |
| 5,526,436 A | 6/1996 | Sekiya | |
| 5,528,355 A | 6/1996 | Maase et al. | |
| 5,588,097 A | 12/1996 | Ono et al. | |
| 5,610,751 A | 3/1997 | Sweeney et al. | |
| 5,629,764 A | 5/1997 | Bahuguna et al. | |
| 5,638,461 A | 6/1997 | Fridge | |
| 5,650,842 A | 7/1997 | Maase et al. | |
| 5,677,763 A | 10/1997 | Redmond | |
| 5,677,782 A | 10/1997 | Peng | |
| 5,699,186 A | 12/1997 | Richard | |
| 5,745,591 A | 4/1998 | Feldman | |
| 5,761,330 A | 6/1998 | Stoianov et al. | |
| 5,777,751 A | 7/1998 | Ward | |
| 5,796,426 A | 8/1998 | Gullichsen et al. | |
| 5,798,923 A | 8/1998 | Laskowski | |
| 5,825,474 A | 10/1998 | Maase | |
| 5,892,599 A | 4/1999 | Bahuguna | |
| 5,937,102 A | 8/1999 | Jin | |
| 6,021,007 A | 2/2000 | Murtha | |
| 6,038,332 A | 3/2000 | Fishbine et al. | |
| 6,041,134 A | 3/2000 | Merjanian | |
| 6,046,867 A | 4/2000 | Rana | |
| 6,175,407 B1 | 1/2001 | Sartor | |
| 6,198,429 B1 | 3/2001 | Fujikawa et al. | |
| 6,198,836 B1 | 3/2001 | Hauke | |
| 6,243,488 B1 | 6/2001 | Penna | |
| 6,341,028 B1 | 1/2002 | Bahuguna et al. | |
| 6,373,969 B1 | 4/2002 | Adler | |
| 6,394,356 B1 | 5/2002 | Zagami | |
| 6,411,441 B1 | 6/2002 | Videen | |
| 6,415,064 B1 | 7/2002 | Oh | |
| 6,424,470 B1 * | 7/2002 | Lindner | 359/725 |
| 6,459,451 B2 | 10/2002 | Driscoll, Jr. et al. | |
| 6,466,686 B2 | 10/2002 | Senior | |
| 6,496,608 B1 | 12/2002 | Chui | |
| 6,616,065 B2 | 9/2003 | Martin | |
| 6,658,164 B1 | 12/2003 | Irving et al. | |
| 6,928,195 B2 | 8/2005 | Scott et al. | |
| 6,993,165 B2 | 1/2006 | McClurg et al. | |
| 7,081,951 B2 | 7/2006 | Carver et al. | |
| 2002/0049714 A1 | 4/2002 | Yamazaki et al. | |
| 2002/0141620 A1 | 10/2002 | Monden | |
| 2003/0012417 A1 | 1/2003 | Hamid | |
| 2003/0099022 A1 | 5/2003 | Karin et al. | |
| 2003/0142856 A1 | 7/2003 | McClurg et al. | |
| 2003/0197853 A1 | 10/2003 | Fenrich | |
| 2003/0206287 A1 | 11/2003 | McClurg et al. | |
| 2004/0109245 A1 | 6/2004 | McClurg et al. | |
| 2004/0109589 A1 | 6/2004 | McClurg et al. | |
| 2004/0109591 A1 | 6/2004 | McClurg et al. | |
| 2004/0114785 A1 | 6/2004 | McClurg et al. | |
| 2004/0114786 A1 | 6/2004 | Cannon et al. | |
| 2005/0105078 A1 | 5/2005 | Carver et al. | |

OTHER PUBLICATIONS

English Abstract for Japanese Patent Publication No. 3-161884, published Jul. 7, 1991, 1 page, from http://v3.espacenet.com/.

International Search Report from PCT Appl. No. PCT/US03/38536, filed Dec. 4, 2003, 4 pages.

International Search Report and Written Opinion (dated Jul. 13, 2005) related to PCT/US04/33400, filed Oct. 12, 2004.

* cited by examiner

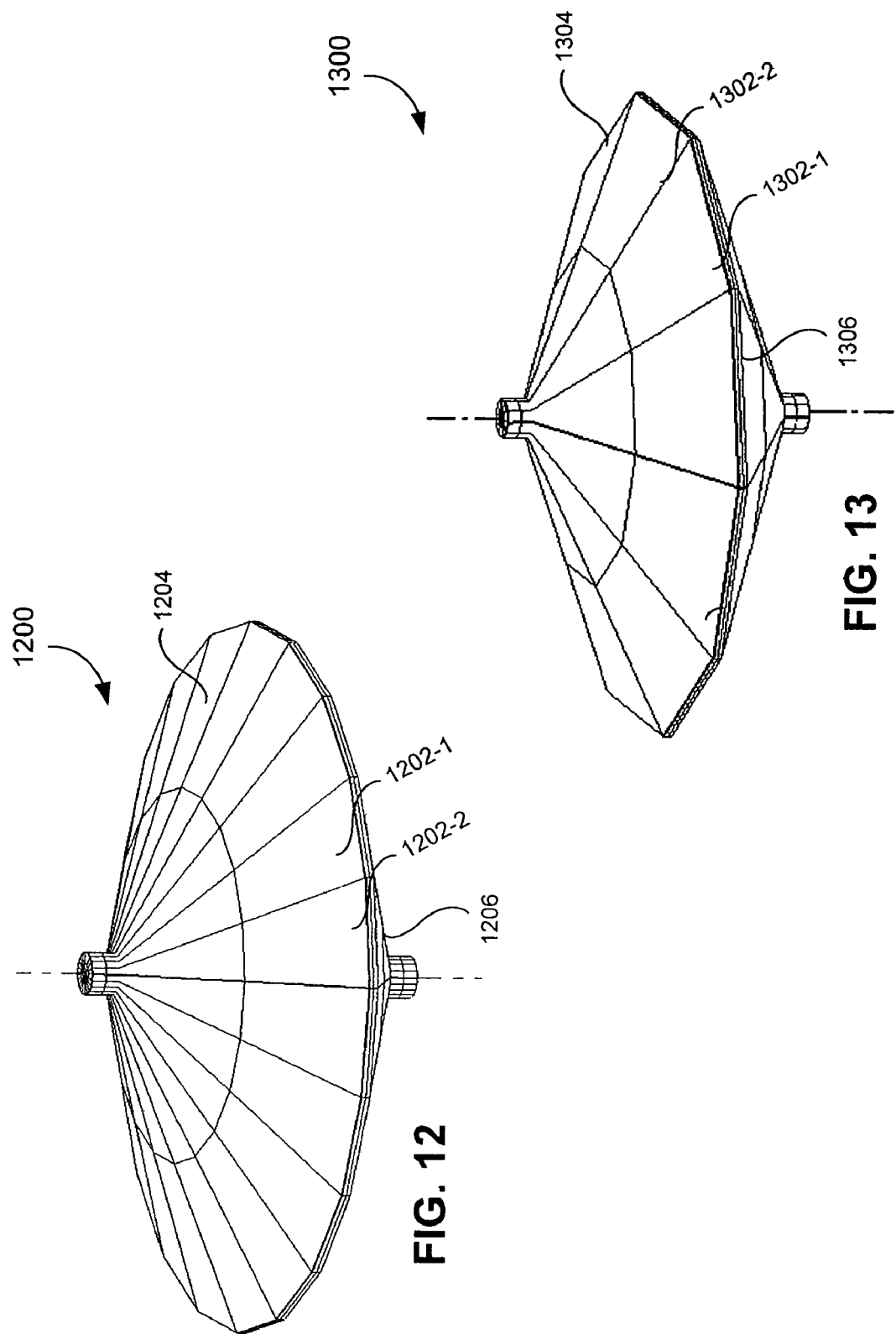

NON-PLANAR PRISM

CROSS REFERENCE TO RELATED APPLICATIONS

This application is a continuation of U.S. application Ser. No. 10/725,539, filed Dec. 3, 2003, which claims the benefit of U.S. Provisional Application No. 60/431,240, filed Dec. 6, 2002, and U.S. Provisional Application No. 60/491,537, filed Aug. 1, 2003, all of which are incorporated herein by reference in their entireties.

BACKGROUND OF THE INVENTION

1. Field of the Invention

The present invention pertains to biometric imaging technology, and in particular, to live scanning of prints.

2. Background Art

Biometrics is a science involving the analysis of biological characteristics. Biometric imaging captures a measurable characteristic of a human being for identity and other related purposes. Print capture and recognition is an important biometric technology. Law enforcement, banking, voting, and other industries increasingly rely upon prints as a biometric to store, recognize or verify identity. Generally, a biometric is a measurable, physical characteristic or personal behavior trait used to recognize the identity, or verify the claimed identity, of a person who has a biometric reference template (e.g., data that represents a biometric measurement) on file.

Biometric imaging systems may include, but are not limited to, print imaging systems. Print imaging systems can capture images of prints on thumbs, fingers, palms, toes, feet, and/or hands. Such print imaging systems are also referred to as scanners or live scanners. Conventional live scanners use light to detect an image of a fingerprint and/or palm print. For example, one or more fingers or a palm are placed on a platen. An illumination source illuminates the underside of the platen. An image representative of valleys, ridges, or other characteristics of a fingerprint or a palm print is then detected by an image sensor, such as a solid-state camera.

One problem with conventional palm live scanner systems is that a palm naturally curves, while a typical platen has a flat planar surface upon which a palm is placed. Thus, there is a chance that not all portions of the palm print will be imaged during scanning. If this occurs, biometric information can be lost.

Also, in many live scanners, increasing the surface area of a flat platen requires a significant increase in the size of a camera being used to detect images on the platen. Large area cameras or sets of cameras can dramatically increase cost and complexity. As a result, the size of the surface area of a flat platen is limited in many live scanners to a size of an average palm or smaller.

Therefore, what is needed is a biometric capture system that includes an optical device shaped to better conform to a palm of a user's hand.

BRIEF SUMMARY OF THE INVENTION

Embodiments of the present invention provide a prism used in a system configured to capture image data representative of biometric data. The prism includes a non-planar first portion that is symmetrical about an axis of symmetry of the prism and is configured to receive a portion of a body of a user, a substantially planar second portion coupled an angle with respect to the non-planar first portion, and a cylindrical opening running from the first portion to the second portion along the axis of symmetry.

Other embodiments of the present invention provide a prism configured to be used in a system for capturing image data representative of biometric data. The prism includes an input portion, a non-planar platen portion, and a exit portion. The input portion is configured to receive light from a light source. The non-planar platen portion is symmetrical about an axis of symmetry of the prism and is configured to receive a portion of a body of a user on a first surface and to totally internally reflect the light from the light source off a second surface. The a exit portion is configured to pass the light that has been totally internally reflected from the second surface of the platen portion onto a detector, which is configured to perform the capturing of the image data.

Still further embodiments of the present invention provide a prism configured to be used in a system for capturing image data representative of biometric data. The prism includes non-planar first and second portions. The first portion is symmetrical about an axis of symmetry of the prism and is configured to receive a portion of a body of a user on a first surface and to totally internally reflect illumination from a second surface. The second portion is also symmetrical about the axis of symmetry of the prism and is coupled to the first portion. The second portion is configured to pass light that has been totally internally reflected from the second surface of the first portion onto a detector that is configured to perform the capturing of the image data.

One advantage of the above embodiments can be that all aspects of print (e.g., a whole hand print or a two-hand print, a palm print, a writer's palm print, a writer's palm print in combination with fingertips, etc.) associated with one or more hands of a user can be captured based on the non-planar first portion.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 12–13 show various prisms according to embodiments of the present invention.

Figure 1:
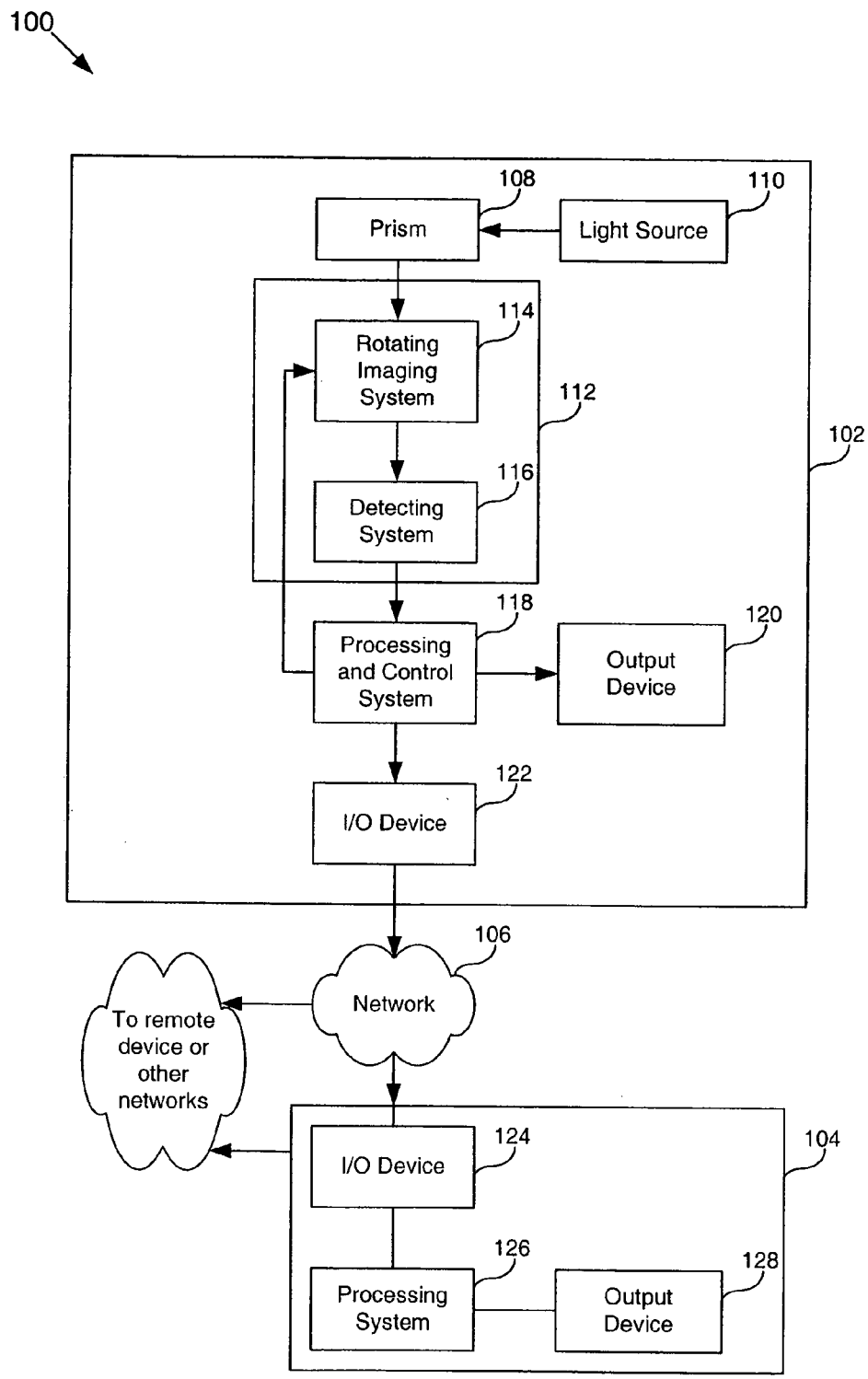
FIG. 1 shows a system for capturing biometric data according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Embodiments of the present invention provide a system and method for scanning all or part of a hand print for one or more hands positioned on a non-planar portion of a prism. The non-planar portion can be symmetrical about an axis of symmetry of the prism. Typically, a palm pocket, writer's palm, or the like, is hard to capture on a flat surface. In contrast, the non-planar portion of the prism according to embodiments of the present invention provides a form so that the palm pocket, writer's palm, or the like, can be captured. Hand and/or finger characteristic data can also be captured, for example hand geometry (e.g., finger lengths and spacing between fingers).

The prism can also include a positioning device (e.g., a hand-locating feature) than can be used to position a hand based on a point between a thumb and an index finger, between any other two fingers, a full hand on one side of the alignment device, both hands with each hand on either side of the alignment device, or to capture writer's palm and/or writer's palm and fingertip images.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "hand print," as used herein according to the present invention, can include any region on a hand having a print pattern, including thenar and hypothenar regions of the palm, interdigital regions, palm heel, palm pocket, writer's palm, and/or fingertips.

The term "biometric data" or "biometric information" throughout the specification can be data representative of a biometric, a digital or other image of a biometric (e.g., raw image data, a bitmap, binary, or other file), extracted digital or other information relating to the biometric (such as minutiae), etc.

The term "live scan" refers to a capture of any type of print image made by a print scanner.

A platen can be movable or stationary depending upon the particular type of scanner and the type of print being captured by the scanner.

The terms "biometric imaging system," "scanner," "live scanner," "live print scanner," "fingerprint scanner," and "print scanner" are used interchangeably, and refer to any type of scanner which can obtain an image of a print pattern on all or part of one or more fingers, palms, toes, feet, hands, etc. in a live scan. The obtained images can be combined in any format including, but not limited to, an FBI, state, or international tenprint format.

The terms "finger characteristic information" and "hand characteristics information" are used to describe hand geometry information, such as finger and thumb lengths and spacing and minutiae extracted from print information.

The term "non-planar prism" includes a prism having a non-planar platen surface that extends around all or part of an axis of the prism, and whose non-planar platen surface allows for total internal reflection of light. A non-planar platen surface allows a print pattern (such as, a print pattern on a hand, a palm pocket, a writer's palm, a writer's palm with fingertips), or other hand characteristic images, to be captured. An example of this type of prism can be an approximately conically-shaped prism. Other examples can be approximately spherically shaped prisms, curved prisms, and the like.

Overall System

FIG. 1 shows a system 100 for capturing image data representing biometric data according to an embodiment of the present invention. System 100 includes a local section or unit 102 and a remote section or unit 104 (e.g., a computer, or the like) that can be coupled via a network 106. Network 106 can be any type of network or combination of networks known in the art, such as a packet-switched network with wired or wireless links, an intranet, the Internet, an Ethernet, or the like. Example links are links having a FIREWIRE or USB network interface. The remote section 104 may be in a same area as the local section 102, such that local and remote refer to an approximate distance they are relative to a final processing device of the image data (e.g., print or hand characteristic data).

Local section 102 includes a non-planar prism 108, having a non-planar portion (e.g., curved) that is symmetrical about an axis of symmetry of the prism, positioned between a light source 110 and a scanning imaging system 112. Scanning imaging system 112 can include a rotating imaging system 114 and a detecting system 116 (e.g., a camera). Scanning imaging system 112 captures image data from parts of a hand (not shown) interacting with non-planar prism 108. The image data is processed in processing and control system 118, which can generate one or both of an output signal and a communications signal, which can include the image data. The output signal can be transmitted to an optional output device 120, while the communications signal can be transmitted to input/output (I/O) device 122. The I/O device 122 then sends the output signal to remote section 104 over network(s) 106

It is to be appreciated that in other embodiments scanning imaging system 112 can include a stationary lens sized to capture all light leaving non-planar prim 108 that has been totally internally reflected from a section of the non-planar prism proximate an area in which a person (not shown) interacts with the non-planar prism 108 and a stationary large area array sensor.

Remote section 104 includes an I/O device 124, a processing system 126, and optionally an output device 128. Processing system 126 can be used to process the image data to generate the biometric data. For example, extraction and matching operations can be performed on the image data to produce biometric data. Once completed, results can be displayed or audibly indicated using output device 128. It is to be appreciated that other processes known in the biometric arts can also be performed in remote section 104. All of these additional processes are contemplated within the scope of the present invention.

It is to be appreciated that network 106 and/or remote device 104 can be coupled to other peripheral devices and/or networks, which is contemplated within the scope of the present invention.

Figure 2:
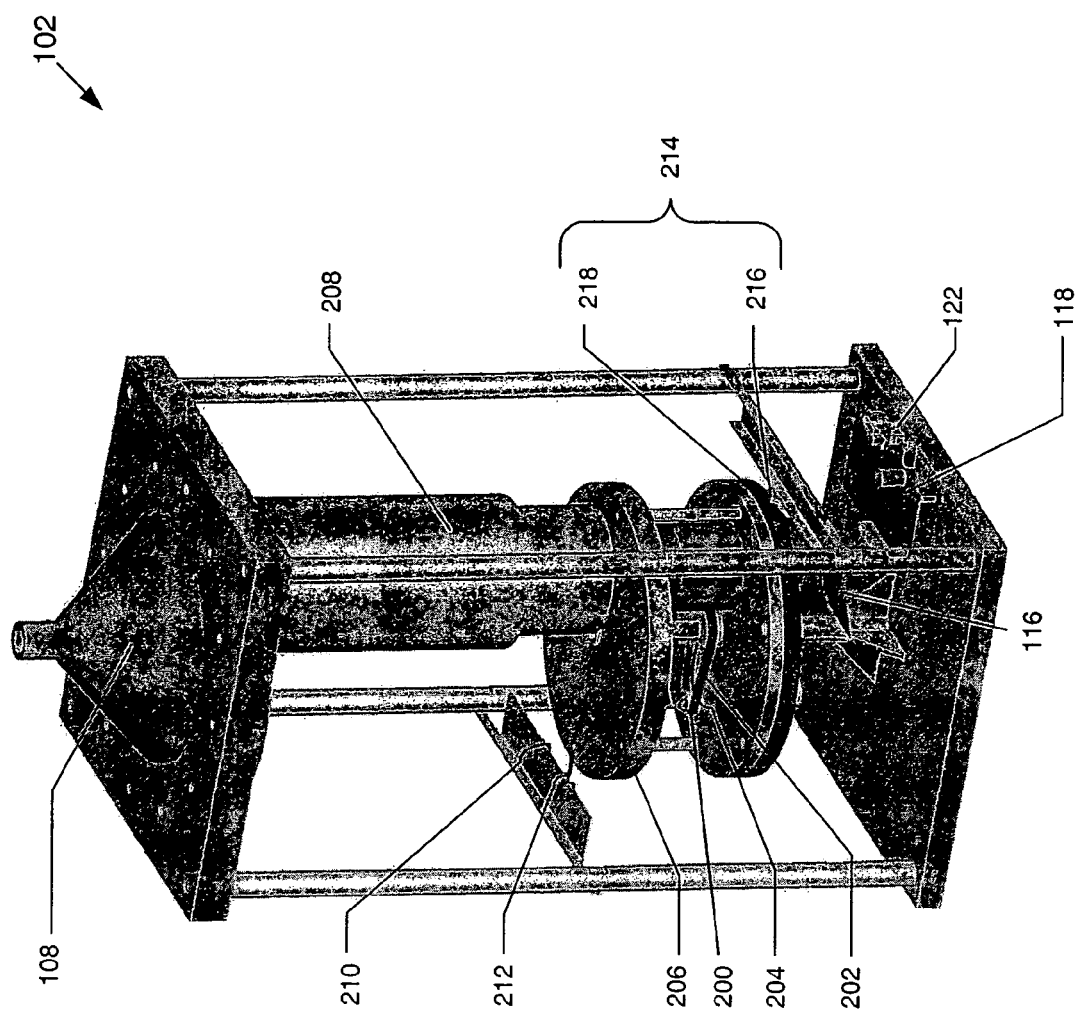
FIG. 2 shows a local section of the system in FIG. 1 according to an embodiment of the present invention.

FIG. 2 shows local section 102 of system 100 according to an embodiment of the present invention. Rotating imaging system 114 can include a motor 200, belt 202, and pulley 204 that rotates rotating stage 206, optical enclosure 208, and detecting system 116 around an axis of symmetry of non-planar prism 108. During rotation, positioning of rotating imaging system 114 can be monitored by controller 118 using signals from stop position sensor 210, home position sensor 212, and/or encoder system 214. In this example, encoder system 214 is an optical position encoder receiving light on sensor 216 after the light interacts with strip 218.

Although certain dimensions and/or types of devices are shown in this figure, these are not meant to be limiting, only exemplary. It is to be appreciated that different sizes or types of elements can be used within the scope of the present invention.

It is to be appreciated that, although not shown, various other types of devices can be used to rotate rotating imaging system 114. For example, an electromagnetic device (e.g., stepper motor), a resilient device, or any other device known to one or ordinary skill in the art are all contemplated within the scope of the present invention. Thus, a motor/belt/pulley system is shown merely as one exemplary way to rotate rotating optical system 114.

Exemplary aspects of system 100 can be found in U.S. application Ser. No. 10/725,537, entitled "System For Obtaining Print And Other Hand Characteristic Information Using A Non-Planar Prism," and U.S. Pat. No. 6,993,165, entitled "System Having A Rotating Optical System And A Non-Planar Prism That Are Used To Obtain Print And Other Hand Characteristic Information," which are both incorporated herein by reference in their entireties.

Non-Planar Prism

Figure 3:
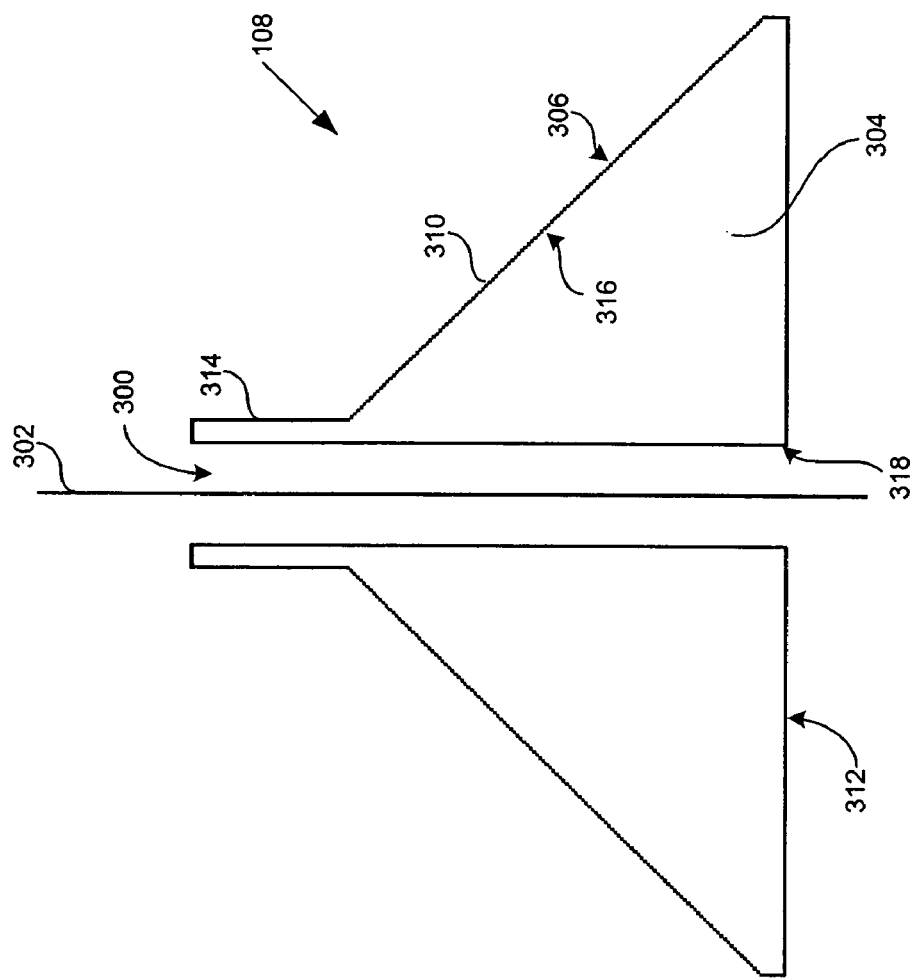
FIGS. 3–8 show various views of a prism according to an embodiment of the present invention.

FIG. 3 shows a cross-sectional view of non-planar prism 108 according to one embodiment of the present invention. Non-planar prism 108 has an opening 300 running along an axis of symmetry 302. Opening 300 is defined within an area 304 of non-planar prism 108 that has a non-planar first portion 310 and a substantially planar second portion 312. A section of top surface 306 of non-planar prism 108 can contain a guide or positioning device 314, which is used to properly place a subject's hand (see FIGS. 15–16) during biometric image capture.

Non-planar prism 108 can be manufactured from transparent, translucent, and/or colored acrylic, glass, plastic, or the like, and may be coated with various protective coatings, as is known in the relevant arts. If the non-planar prism material is colored, it can be of a color that matches a color of light for a light source being used. A first surface 306 of first section 310 is shaped so as to provide the non-planar aspect to prism 108. As discussed above, the non-planar shape is preferably approximately conical, but can also be curved, spherical, or the like, so long as a second surface 316 provides total internal reflection of incident light.

Platen surface 306 is a surface upon which an object (e.g., a hand(s)) having a print is placed. Platen surface 306 can be a surface of non-planar prism 108 or another surface in optical contact with an outside surface of prism 108. For example, platen surface 306 can be a surface of an optical protective layer (e.g., silicone pad) placed on prism 108 at section 310.

Figure 15:
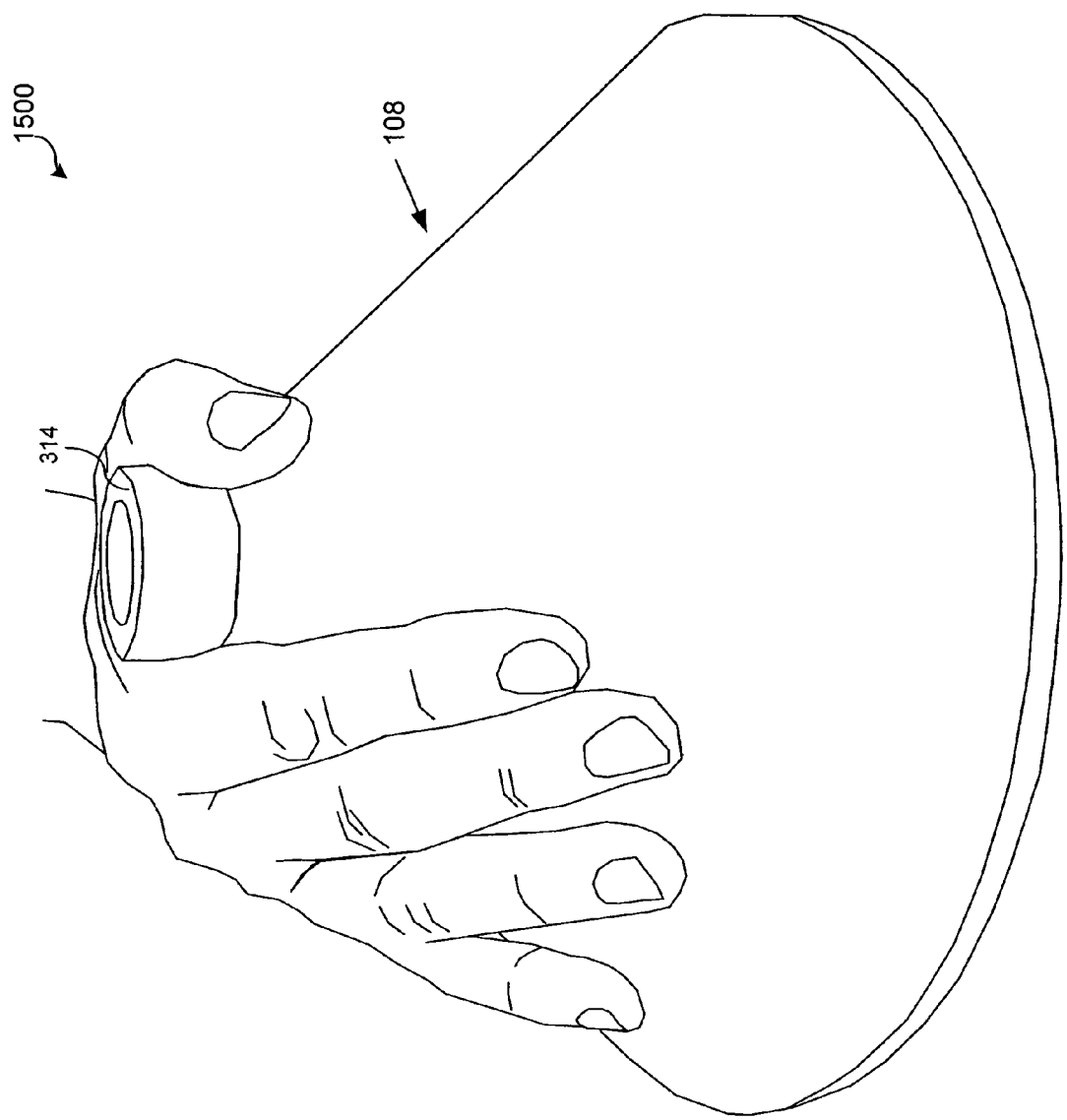
FIGS. 15–16 illustrate how a subject places one or both hands, respectively, on a prism according to various embodiments of the present invention.
Figure 16:
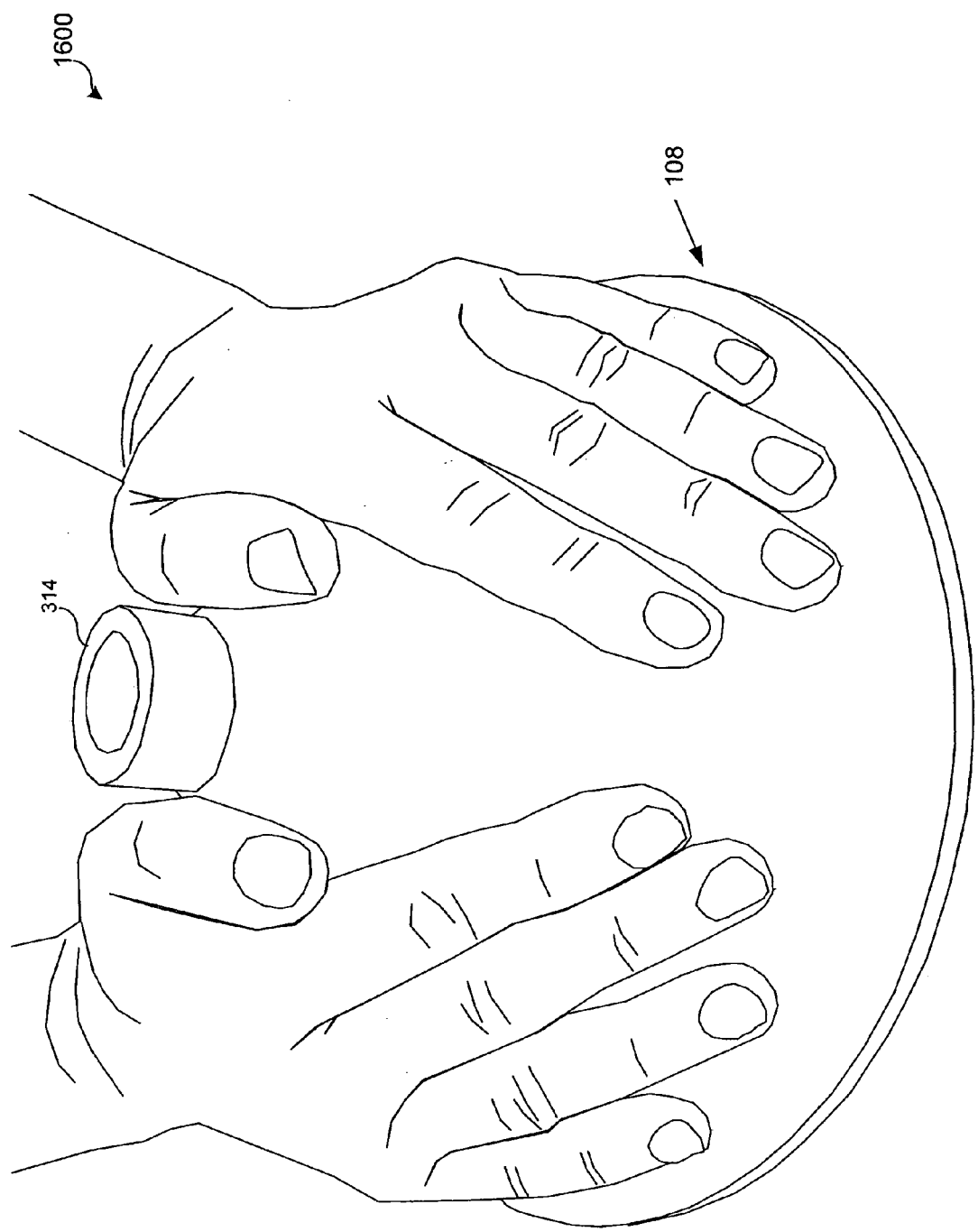

During operation, the subject's hand is positioned using positioning device 314 (see FIGS. 15–16). Light enters non-planar prism 108 through an input face or portion either from within opening 300 or via an edge 318 of opening 300. The light totally internally reflects from second surface 316 out second or exit section 312 through rotating imaging system 114 onto detector 116. Examples of image capturing configurations are found in U.S. Pat. No. 6,993,165 entitled, "System Having A Rotating Optical System And A Non-Planar Prism That Are Used To Obtain Print And Other Hand Characteristic Information."

Through use of the shape shown for non-planar prism 108, substantially all or part of a hand (e.g., thenar and/or hypothenar region of the palm, the "writer's palm," inter digital regions, palm heel, palm pocket, and/or fingertips) (see FIGS. 17–21) can be captured in one or more scans. This is partially because a surface area of section 310 is sized to receive one or more hands wrapped around non-planar prism 108 generally along a direction of a curve. Accordingly, in embodiments, images with features of up to two hands of a subject can be captured in a single scan. Examples of image capture methods can be found in U.S. Ser. No. 10/725,542 entitled, "Biometric System For Capturing Print Information Using A Coordinate Conversion Method," Ser. No. 10/725,540 entitled, "Methods For Obtaining Print And Other Hand Characteristic Information Using A Non-Planar Prism," and Ser. No. 10/725,541 entitled "System And Method For Generating A Preview Display In A Print Capturing System Using A Non-Planar Prism," which are all incorporated herein by reference in their entireties.

Figure 5:
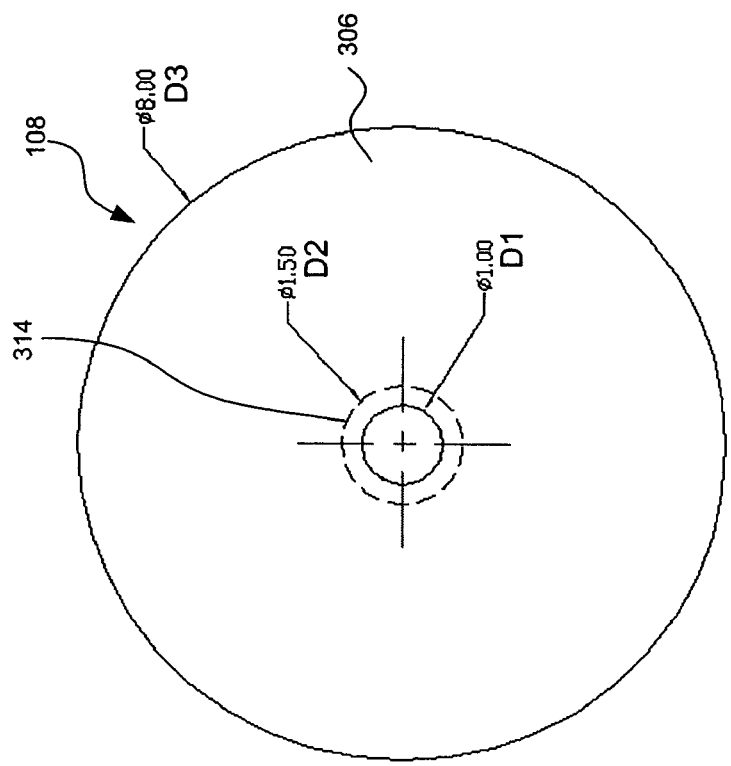
Figure 4:
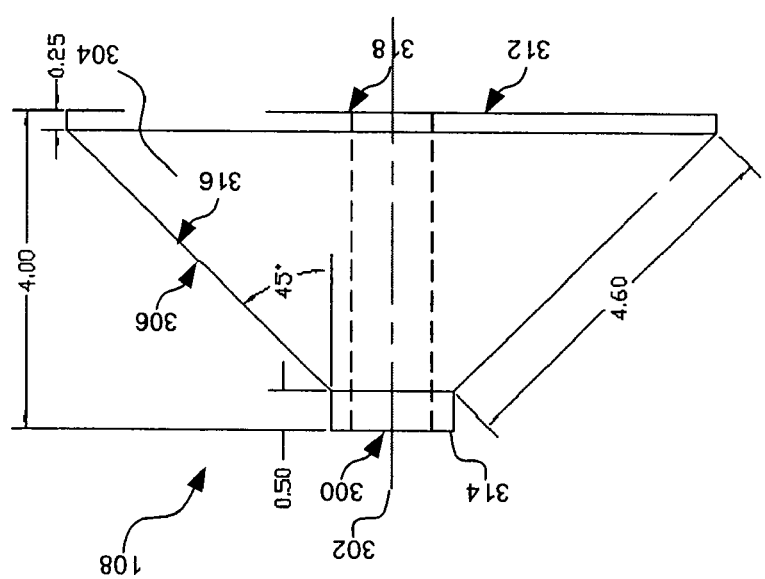

FIGS. 4–5 show possible dimensions for non-planar prism 108 according to an embodiment of the present invention. In this example, non-planar prism 108 is approximately a 45 degree by 45 degree by 90 degree non-planar prism, with respect to opening 300. Other angles can be used as long as total internal reflection is maintained to allow capture of print images. Also, in this example, a diameter D1 of opening 300, a diameter D2 of positioning device 314, and a diameter D3 of non-planar prism 108 are shown in FIG. 5. These diameters are exemplary, and not intended to limit the invention in any way. It is to be appreciated that other dimensions for these diameters could also be used (e.g., larger or smaller).

Figure 7:
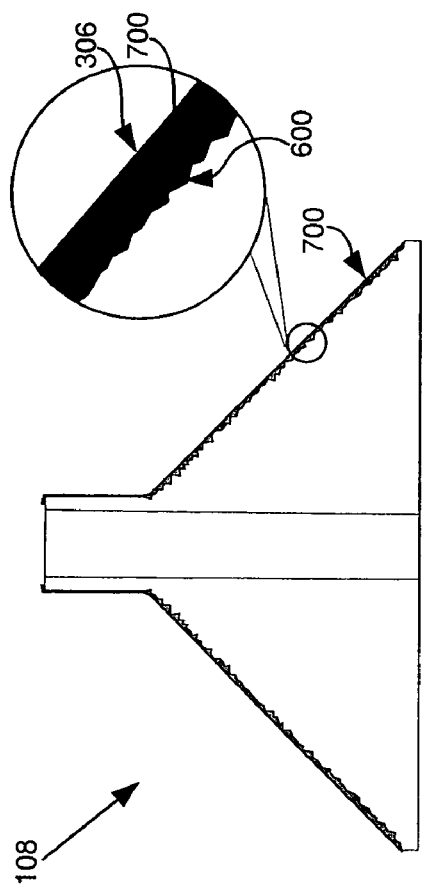
Figure 8:
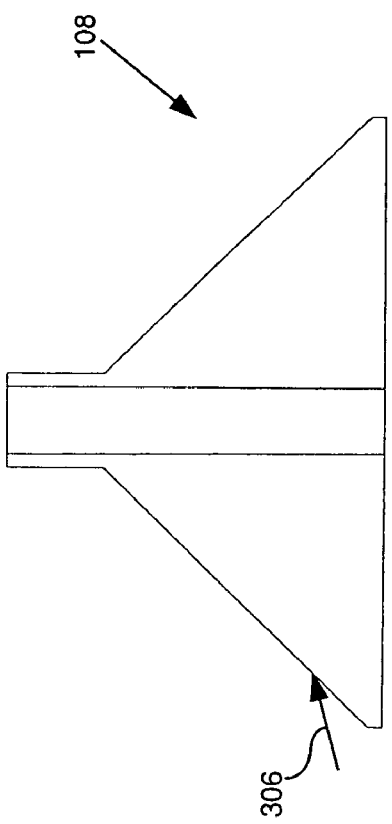
Figure 6:
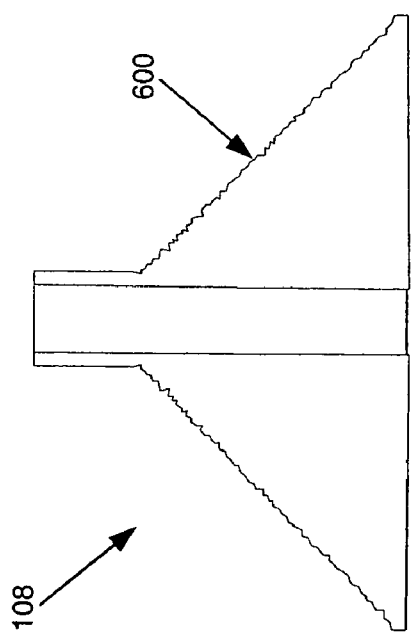

FIGS. 6–8 show stages of surface 600 of non-planar prism 108 when surface 600 undergoes a smoothing process.

In FIG. 6, surface 600 is shown after receiving a machine finish. It is to be appreciated that this figure is not drawn to scale. The roughness of surface 600 is exaggerated for purposes of illustration. The machine finish can be achieved using a mill, a lathe, a shaper, a machine tool, a human tool, a cast, a grinder, a polisher, or the like. These tools usually leave surface 600 with the machine finish. A certain roughness can occur at a machine finish of less than 32 micro inches root mean square. Another finishing method can be to use a diamond turned surface device, which leaves surface 600 closer to optical quality finish. Typically, the machine finish may appear and feel smooth, but it can be orders of magnitudes away from being an optical quality finish. For example, the machine finish can have valleys and grooves of about 16 micro inches, while optical quality is typically measured in wavelengths of light.

In FIG. 7, a protective refractive index matched coating 700 can be applied over the machine finish. The coating 700 can be transparent and have a viscosity that allows it to flow into and fill rough contours of surface 600 to obtain a high quality optical finish. The coating 700 can be applied through various techniques (e.g., dipping, spinning, vapor deposition, sputter deposition, spraying, etc.). The technique chosen can vary based on a type of coating material used, its viscosity, and its curing requirements. In some cases, dielectric materials in the coating can retain a large electrostatic charge, which is known to attract and retain undesirable particles of dust, dirt, and other foreign materials. The addition of an optically clear, electrically conductive material within coating 700 can be utilized to eliminate this problem.

In FIG. 8, surface 306 is shown as an optically finished surface. After the coating 700 is applied, excess coating can be removed. The remaining surface is cured (e.g., using air drying, UV radiation, heat, or the like).

Use of coating 700 can facilitate the application of an optical target (see element 2292 in FIG. 22) on surface 306 of non-planar prism 108. Target 2292 may be applied by a variety of techniques (e.g., silk screening, stamping, photo transfer, laser engraving, mechanical engraving, etc.). Target 2292 can be a calibration target or other information desired in a particular application. Coating 700 can also provide protection of the prism surface from mechanical damage.

Figure 9:
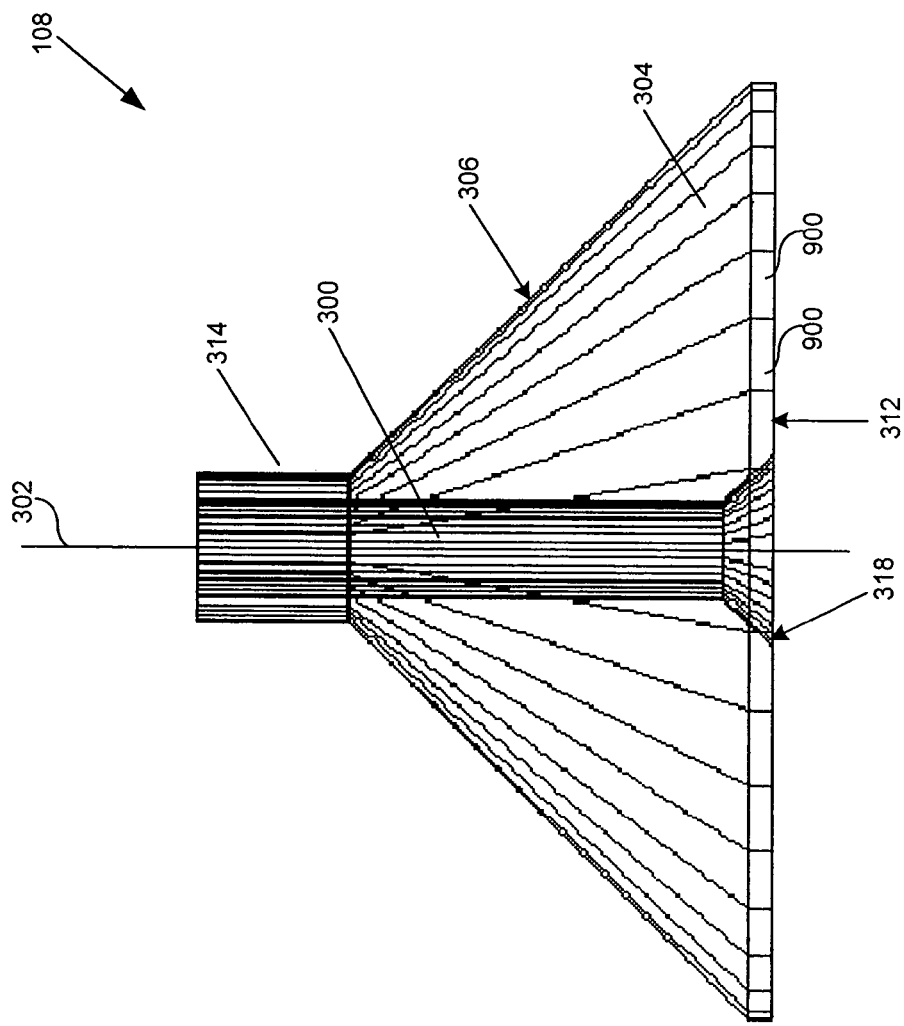
FIGS. 9–11 show various views of image sectional areas on a prism according to various embodiments of the present invention.
Figure 10:
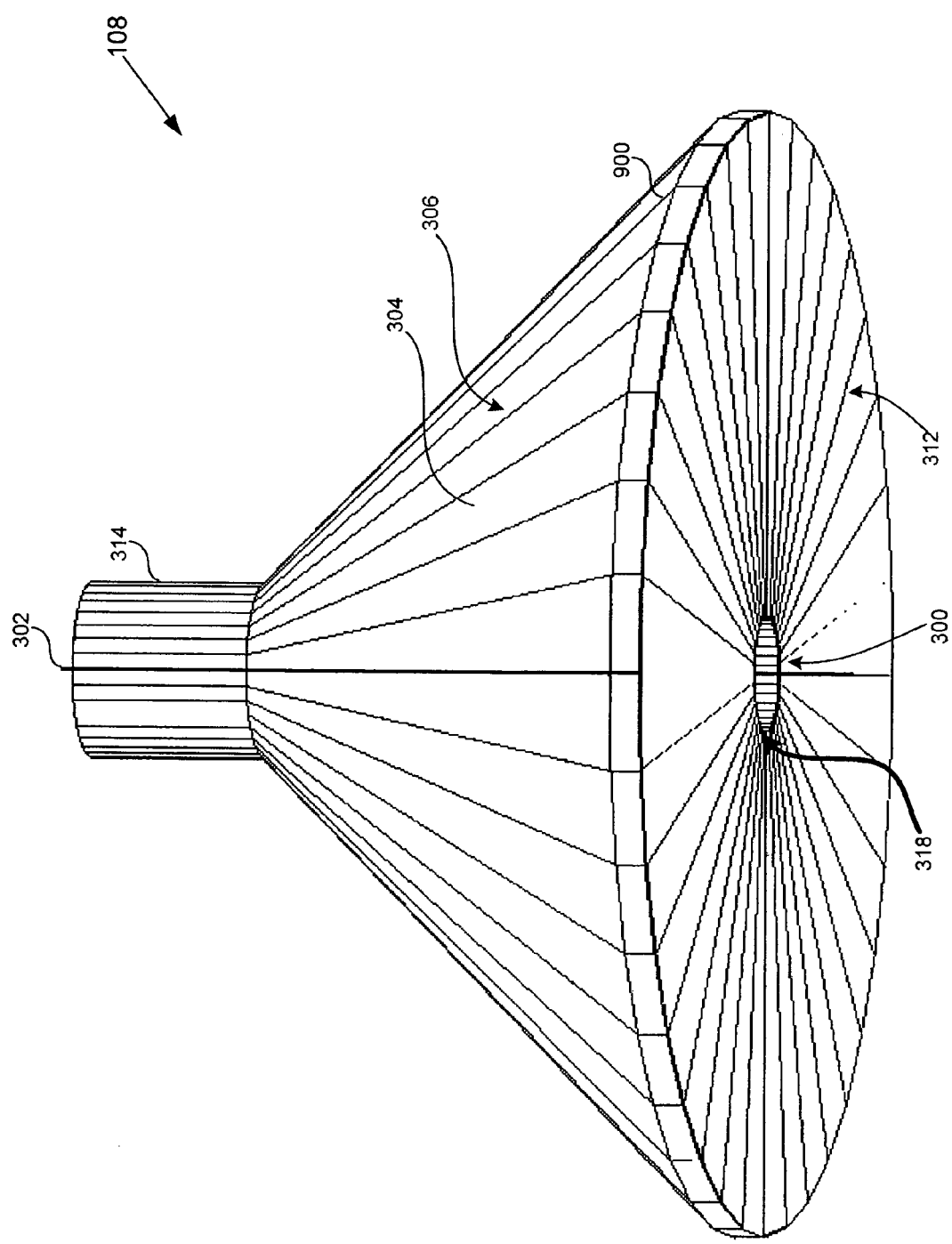
Figure 11:
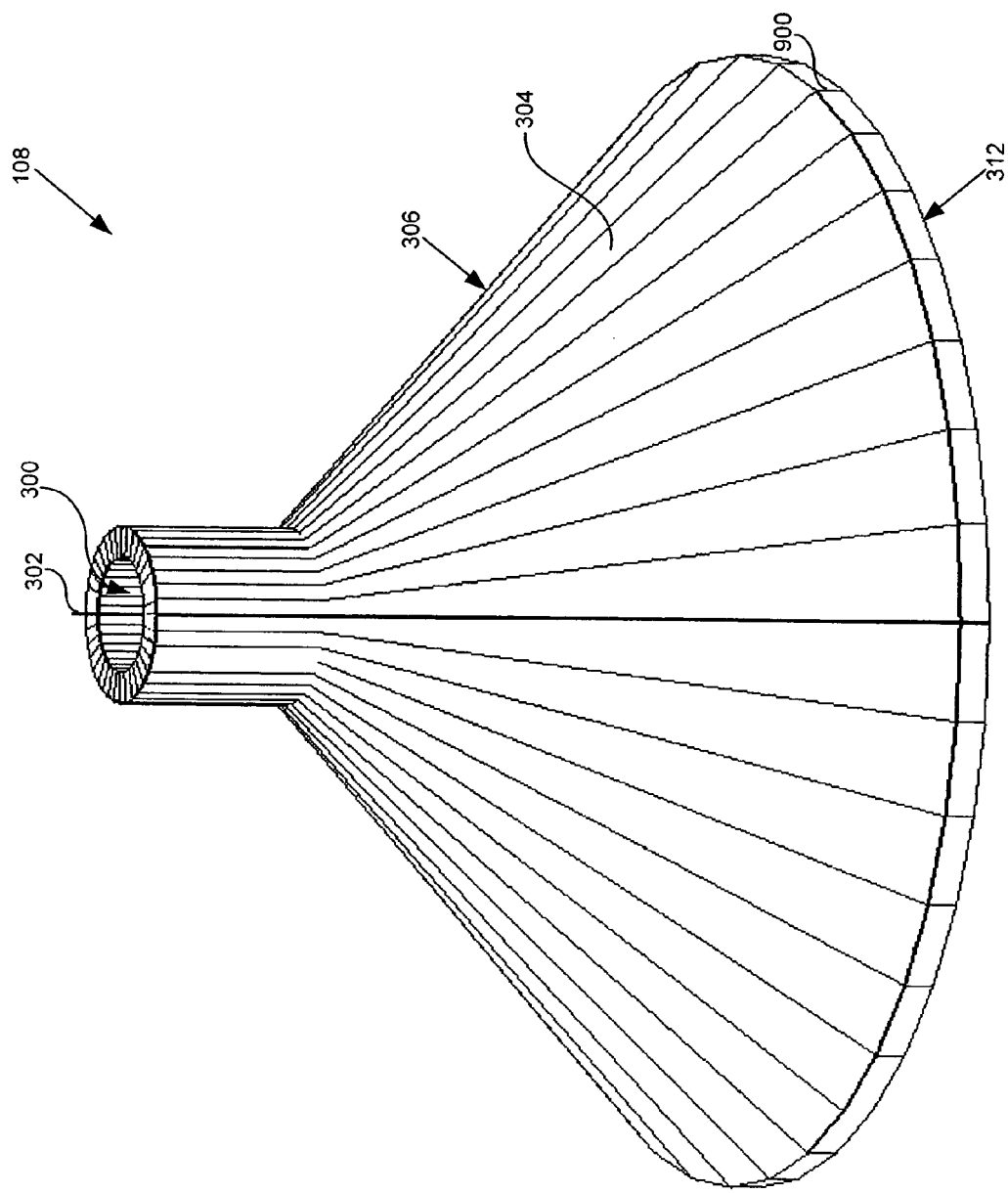

FIGS. 9–11 show a side, bottom perspective, and top perspective view, respectively, of non-planar prism 108, according to various embodiments of the present invention. These figures also show, although not to scale, scan sections 900 (e.g., radial scan line images) that can occur during scanning of a subject's hand (or hands). For example, as described above, scanning image capture system 112 can take images at each scan section 900 that are later processed to form a hand print image and/or used to determine print, finger, or hand characteristic information.

FIG. 9 incudes opening 300 that includes opening edge 318 that can have various finishes, such as a chamfered finish. For example, non-planar prism 108 can have a chamfered finish to edge 318 when configured for use with inside edge light sources. In contrast, as seen in FIG. 10, opening edge 318 can be squared, which is used for light sources that are inserted into section 300. Although not shown, a non-planar prism 108 can have an outside edge that is chamfered, which can be used with an outside edge light source. Still other configurations of non-planar prism 108 can be used to comply with other light source positions, which are all contemplated within the scope of the present invention.

FIGS. 12–13 show non-planar prisms 1200 and 1300, respectively, according to various other embodiments of the present invention. In FIGS. 12 and 13, non-planar prisms 1200 and 1300 have multi-faceted sections, that is they have multiple individual planar sections 1202-$n$ and 1302-$n$ arranged about an axis, where n is an integer (shown as n=1 and n=2 in the figures). It is to be appreciated that in an embodiment in which n approaches infinity (e.g., possibly 1000 planar sections 1202 or 1302 per inch), an outer surface of prism 1200 and 1300 can appear and feel smooth, similar to prism 108.

Prisms 1200 and 1300 shown in FIGS. 12–13 also have first and second non-planar sections (e.g., surfaces) 1204/1206 and 1304/1306, in contrast to only one non-planar section in prism 108 in previous configurations. Thus, both top 1204 or 1304 and bottom 1206 and 1306 portions of prisms 1200 and 1300 in FIGS. 12 and 13 have non-planar surfaces, which is in contrast to prism 108 that has a planar base.

In one embodiment, sections 1202 and 1302 are discrete, planar sections that form multi-faceted portions of prisms 1200 and 1300. This is in contrast to prism 108 that may be unitary and have a smooth contour and a circular circumference. Although shown with a certain number of sections 1202 and 1302, other numbers of sections 1202 and 1302 can also be used without departing from the scope of the present invention. Prisms 1200 and 1300 including individual facet sections 1202, 1302 can be formed as unitary structures or from individual sections coupled together.

Figure 14:
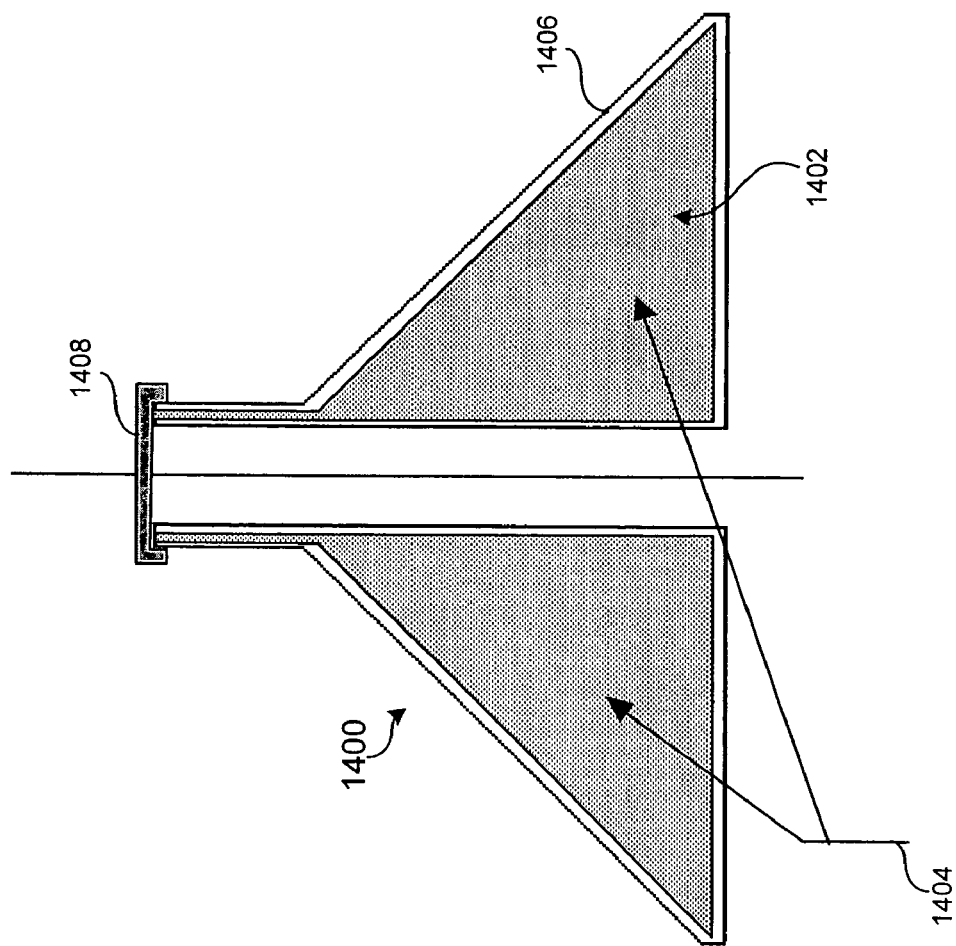
FIG. 14 shows a material filled prism according to an embodiment of the present invention.

FIG. 14 shows a non-planar prism 1400 according to an embodiment of the present invention. Non-planar prism 1400 has a same general shape as non-planar prism 108, except it contains a cavity 1402 that can be filled with a liquid, fluid, gel, solid, or gas medium or material 1404. The medium or material 1404 can be chosen so that is has a similar or substantially same refractive index as non-planar prism surface 1406, although having a different refractive index is also contemplated within the scope of the present invention. A closing device 1408 (e.g., a cap) can be used to seal cavity 1402.

FIGS. 15–16 illustrate how a subject places one hand 1500 or both hands 1600 on a non-planar prism (e.g., prism 108). As can be seen, positioning device 314 in used is either case to properly align the hand 1500 or hands 1600 on non-planar prism 108 for image capture. This is also true when a positioning device of prisms 1200, 1300, or 1400 is used.

Figure 21:
FIG. 21 show an image of a print pattern of left and right hand prints taken during different scans and captured according to an embodiment of the present invention.

Although not shown in this figure, it is to be appreciated that a subject can also place an entire hand 1500 on either side of the positioning device 314 in order to capture both hands 1600 in a single scan. Using a non-planar prism allows for all portion of a hand 1500 or hands 1600, including a palm pocket, to be captured, as shown in FIG. 21.

Further, although not specifically shown in FIGS. 15 and 16, a subject can place one or both hands on non-planar prism 108 writer's palm side down on platen surface 306 so as to capture a writer's palm. Also, a subject can place one or more writer's palms and fingertips down to capture an image of a writer's palm and fingertips in a single scan, see FIG. 20.

Captured Hand Sections

FIGS. 17–22 show examples of various aspects of a hand or palm that can be imaged in order to generate biometric information or data. These are merely exemplary areas of a hand or palm. Other areas can be imaged, as would be apparent to a person skilled in the art given this description. These examples are not meant to limit the invention.

Figure 17:
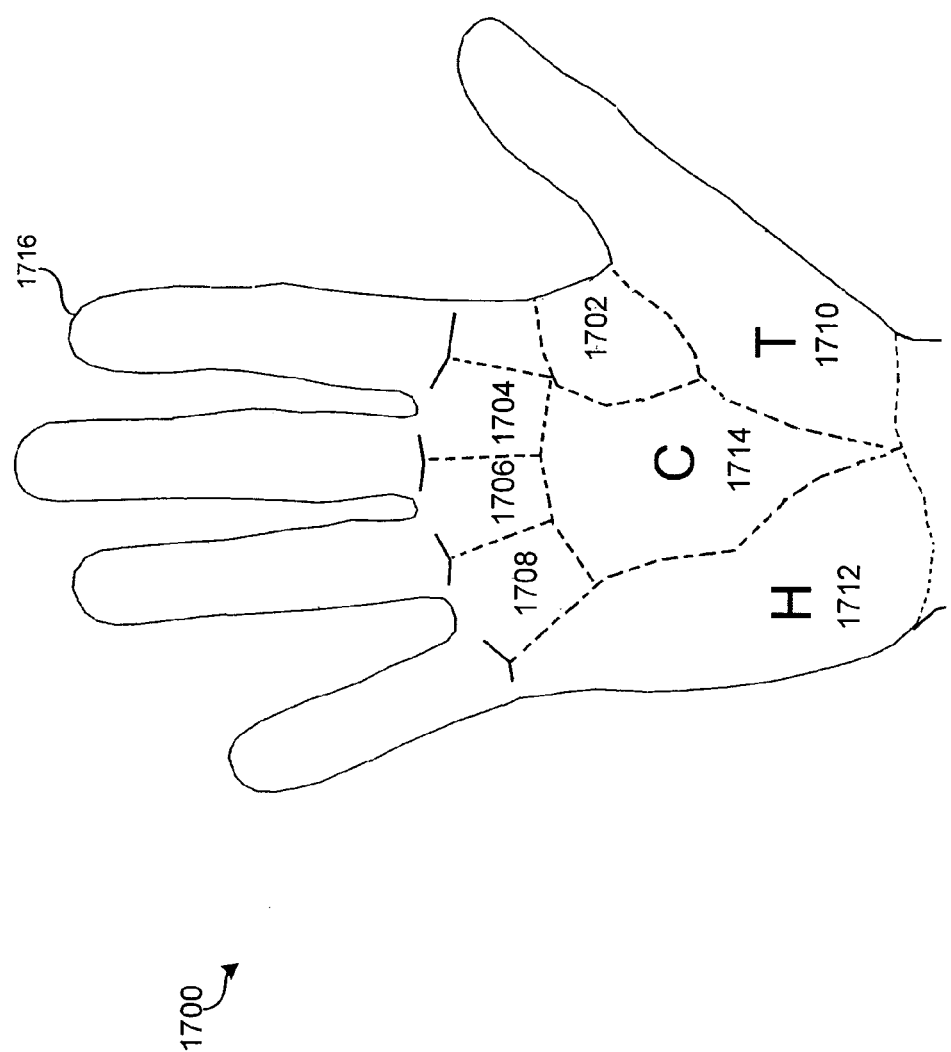
FIGS. 17–19 show various parts of a hand used during image and biometric analysis according to embodiments of the present invention.

FIG. 17 shows sections 1702–1714 of a palm 1700 of a hand 1716 that can be imaged, according to embodiments of the present invention. Section 1702 is a first interdigital area. Section 1704 is a second interdigital area. Section 1706 is a third interdigital area. Section 1708 is a fourth interdigital area. Section 1710 is a thenar area. Section 1712 is a hypothenar area. Section 1714 is a central area or palm pocket.

Figure 18:
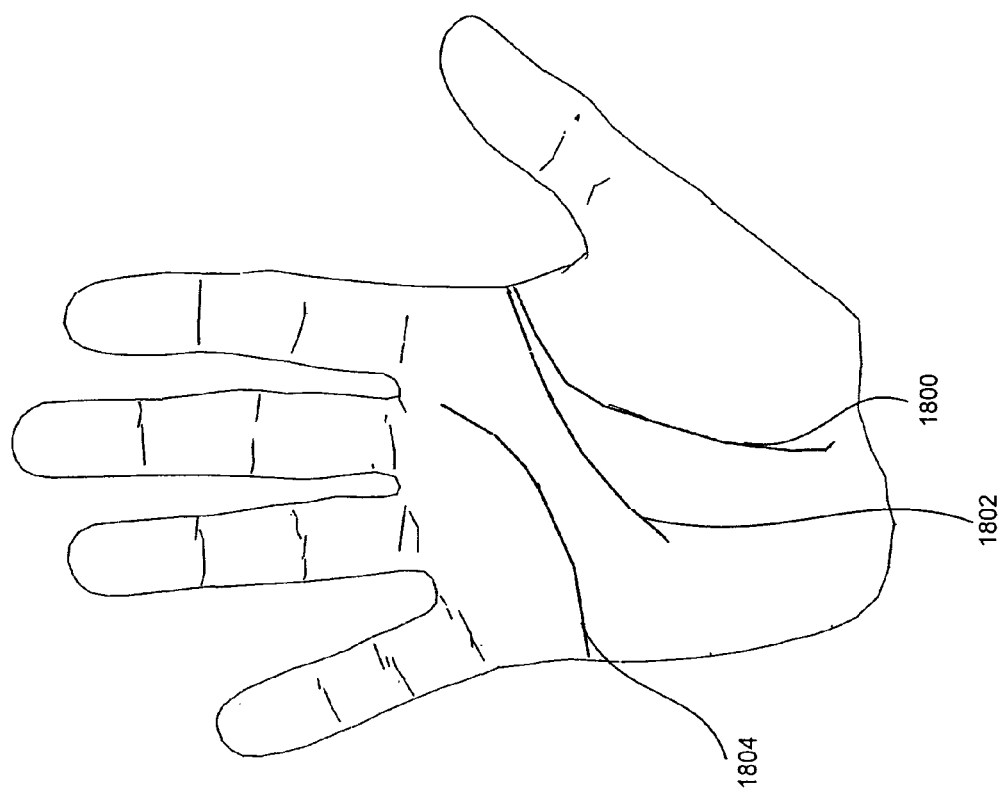

FIG. 18 shows creases 1800–1804 of palm 1700 that can be included in an image, according to embodiments of the present invention. Crease 1800 is a thenar crease. Crease 1802 is a proximal transverse crease. Crease 1804 is a distal transverse crease.

Figure 19:
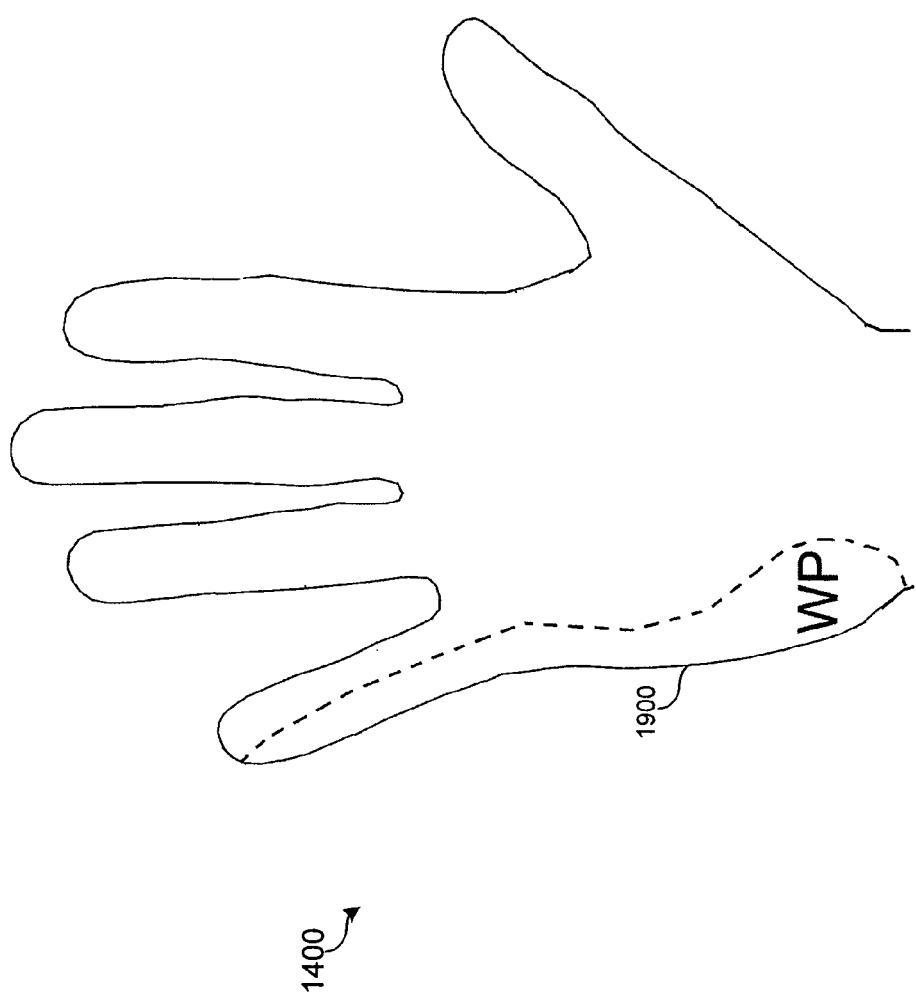

FIG. 19 shows a writer's palm or writer's palm hypothenar area 1900 of palm 1700. Writer's Palm 1900 includes a print pattern (ridges and valleys) that extends from palm hypothenar area 1712 up along a side of the hand.

Figure 20:
FIG. 20 shows an image of a print pattern of writer's palms and fingertips captured according to an embodiment of the present invention.

FIG. 20 shows images 2000 of right (R) and left (L) hand writer's palms 1900 and fingertips 2002, according to an embodiment of the present invention.

According to a feature of the present invention, writer's palm 1900 and fingertips 2002 can be captured in a single scan because of the shape of non-planar prism 108. Unlike conventional planar platen surfaces, writer's palm 1900 and fingertips 2002 can be placed on a non-planar prism 108 at the same time during a live scan without requiring any difficult or awkward contortions of a person's hand.

FIG. 21 shows images 2100 of right and left hand prints captured during two scans of scanner 112 according to an embodiment of the present invention.

Figure 22:
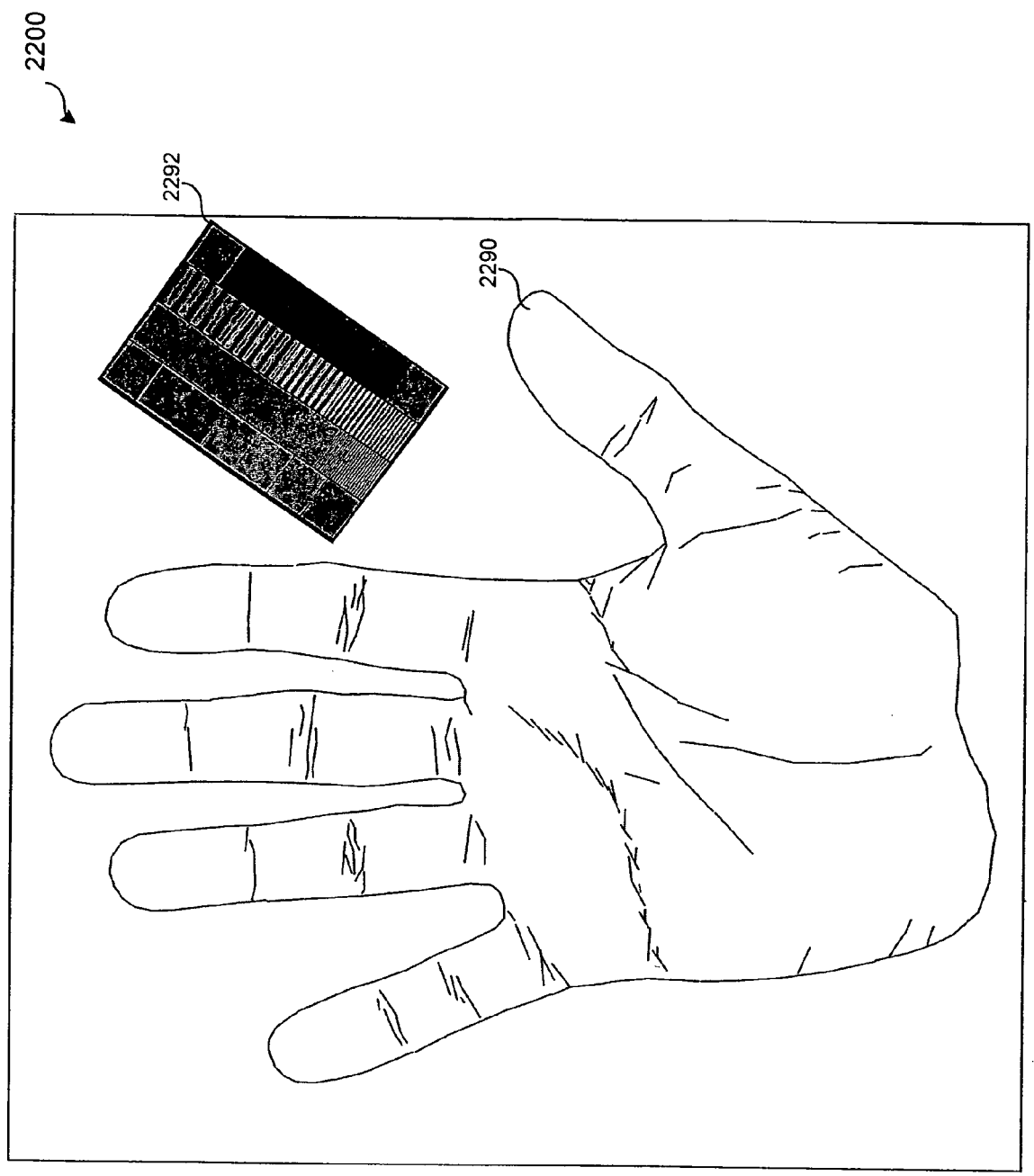
FIG. 22 shows an exemplary image including hand print data and calibration data according to an embodiment of the present invention.

FIG. 22 shows an exemplary image 2200 including image data of both a hand print and/or hand characteristic information 2290 and calibration data 2292. This can include any print information described above, including writer's palm and/or writer's palm and fingertip information. This may produce more readily admissible evidence under the Federal Rules of Evidence based on capturing and storing together the calibration data and the image data.

Capturing calibration data can be used to reproduce substantially exactly the image as originally captured. This is especially helpful as data is achieved and subsequently accessed at different times by different systems and applications. Such systems and applications can access both the image data and calibration data in an original scan to enable successful, high-quality reproduction or analysis of the captured image data with appropriate calibration. Also, calibration data can be used to ensure system 100 is calibrated to capture a consistent and accurate image 2200. For example, system 100 can be calibrated each time scanning system 112 scans calibration data on non-planar prism 108.

As described above, the non-planar surface of the non-planar prism allows for a pocket of a palm of hand to make contact with a platen and break a surface total internal reflection of the non-planar prism. This creates a mechanism for capturing a high contrast round palm print image. According to further embodiments, a print image can also be captured that includes both a palm print and one or more fingerprints on a same hand. In this way, other biometric information can be extracted from the print images, such as, the association of the palm and fingerprints as belonging to the same hand, distance information on the distance from palm locations to finger locations, etc. According to still further embodiments, both a hand print and target/calibration information can be captured at a same time and stored together.

CONCLUSION

While various embodiments of the present invention have been described above, it should be understood that they have been presented by way of example only, and not limitation.

It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A prism having an axis of symmetry, comprising:
a non-planar first portion that is symmetrical about the axis of symmetry;
a non-planar or a substantially planar second portion coupled at an angle with respect to the non-planar first portion;
a cylindrical opening running from the first portion to the second portion along the axis of symmetry; and
a cylindrical extension that extends upwards from the first portion along the axis of symmetry.

2. The prism of claim 1, wherein the first portion comprises a conical shape.

3. The prism of claim 1, wherein the first portion comprises an outside surface comprising:
a machined layer; and
a coating layer substantially covering the machined layer.

4. The prism of claim 3, wherein the coating layer comprises a protective coating.

5. The prism of claim 3, wherein the machined layer comprises an optical quality finish.

6. The prism of claim 3, wherein the coating layer comprises a high quality optical finish.

7. The prism of claim 3, wherein a refractive index of the coating layer substantially matches a refractive index of the prism.

8. The prism of claim 1, wherein the prism comprises at least one of acrylic, glass, or plastic.

9. The prism of claim 1, wherein the prism comprises colored material or clear material.

10. The prism of claim 1, wherein the first portion comprises a curved shape.

11. The prism of claim 1, wherein the cylindrical opening includes a chamfered edge.

12. The prism of claim 1, wherein:
the first portion comprises an input face configured to receive an illumination light and a platen face configured to receive a print pattern; and
the second portion comprises an exit face.

13. The prism of claim 12, wherein a surface area of the platen face is larger than a surface area of the exit face.

14. An apparatus, comprising
an optical element that is symmetrical about an axis of symmetry, the optical element including:
a substantially planar top portion;
a substantially planar bottom portion, which is substantially parallel to the top portion;
a substantially conical body portion located adjacent the top portion and adjacent the bottom portion; and
a cylindrical extension having first and second ends, the second end being adjacent the top portion and extending from the top portion,
wherein the top, bottom, and body portions of the optical element are symmetrical about the axis of symmetry,
wherein the top and bottom portions of the optical element have a central, circular opening therein,
wherein the body portion of the optical element has a cavity including a cylindrical region and a conical region, wherein an axis of symmetry of the cylindrical region is along the axis of symmetry of the optical element, wherein an axis of symmetry of the conical region is along the axis of symmetry of the optical element, wherein the cylindrical region is adjacent the central, circular opening of the top portion of the optical element and the conical region, wherein a second end of the conical region is adjacent the central, circular opening of the bottom portion of the optical element, and wherein the first end of the cylindrical extension is adjacent the central, circular opening of the top portion of the optical element.

* * * * *